United States Patent [19]

Van Gerwen

[11] 4,034,160
[45] July 5, 1977

[54] SYSTEM FOR THE TRANSMISSION OF SPEECH SIGNALS

[75] Inventor: Petrus Josephus Van Gerwen, Eindhoven, Netherlands

[73] Assignee: U.S. Philips Corporation, New York, N.Y.

[22] Filed: Mar. 5, 1976

[21] Appl. No.: 664,409

[30] Foreign Application Priority Data
Mar. 18, 1975 Netherlands ............... 7503176

[52] U.S. Cl. ................. 179/15.55 R; 179/1 SA
[51] Int. Cl.² ................. G10L 1/00; H04B 1/66
[58] Field of Search ............ 179/1 SA, 15.55 R

[56] References Cited
UNITED STATES PATENTS

| | | | |
|---|---|---|---|
| 3,071,652 | 1/1963 | Schroeder | 179/1 SA |
| 3,330,910 | 7/1967 | Flanagan | 179/1 SA |
| 3,344,349 | 9/1967 | Schroeder | 179/1 SA |
| 3,952,164 | 4/1976 | David | 179/1 SA |

Primary Examiner—Kathleen H. Claffy
Assistant Examiner—E. S. Kemeny
Attorney, Agent, or Firm—Frank R. Trifari; Henry I. Steckler

[57] ABSTRACT

A speech bandwidth compression system uses a first set of filters to separate the speech signal into baseband (300–800 hz) and highband (800–3200 hz) signals. The baseband (first formant or fundamental pitch frequency) is transmitted directly, and is also rectified to form harmonics which are mixed with the highband signals in a second set of (paired digital) filters which form sine and cosine forms (amplitude and phase information) of the harmonic components, which are then multiplexed for transmission to a receiver which provides the corresponding bandwidth expansion system to reconstruct the original speech signal.

24 Claims, 9 Drawing Figures

SYSTEM FOR THE TRANSMISSION OF SPEECH SIGNALS

The invention relates to a system, for speech signal transmission provided with a transmitter having a band compressor and with a receiver having a band expander, the band compressor at the transmitter comprising a baseband channel for a baseband of speech signals located in a lower speech frequency range and also a set of parallel band compressor channels for band compression of successive sub-bands of the speech signals in the speech frequency range located above the baseband, the band expander at the receiver comprising a baseband channel and a corresponding set of parallel band expander channels for recovering the original speech signals. The first formant frequency range or the fundamental tone frequency may, for example, be used as a baseband signal.

In a known transmission system of the above-mentioned type, each of the parallel band compressor channels comprises a frequency divider and an amplitude detector for generating, by means of frequency division and amplitude detections frequency and amplitude data in respect of each of the subbands of the speech signals. The frequency and amplitude data obtained in this manner is transmitted, together with the first formant range which serves as the baseband signal. At the receiver, each of the parallel band expander channels comprises a frequency multiplier and an amplitude modulator for recovering, by means of frequency multiplication and a subsequent amplitude modulation, the original subbands of the speech signals from the frequency and amplitude data in the corresponding band compressor channel, whereafter the original speech signal is obtained by combining these recovered subbands with the first formant range serving as the baseband signal.

It is an object of the invention to provide another concept of a transmission system of the above-mentioned type which combines a considerable improvement of the reproduction quality with a hardly critical and conveniently structured implementation and which is particularly suitable for use in digital techniques and integration in a semiconductor body.

The transmission system according to the invention is characterized in that the band compressor and the band expander each comprise an input circuit which is provided with a component generator connected to a baseband channel for generating frequency components in the sub-bands of the speech frequency range located above the baseband and in that the band compressor and the band expander each further comprise a frequency analyser having for each sub-band a first and a second sub-band filter with the same amplitude-frequency characteristics but with phase-frequency characteristics having a relative phase difference, the band compressor together with the set of parallel band compressor channels also comprising a series of parallel reference channels, at least one of these channel set including said frequency analyser having for each sub-band a first and a second sub-band filter, which band compressor includes in the various band compressor channels a comparator as well as a limiting circuit for obtaining a constant amplitude value of the frequency component generated in the component generator at the input of the comparator which is controlled through a reference channel by frequency components in the same sub-band of the orifinal speech signal, which frequency components serves a reference signal for generating phase and amplitude data characteristic of the relevant sub-bands, said frequency analyser having per sub-band a first and second sub-band filter included in the band expander in the set of parallel band expander channels, the various band expander channels also comprising a modulator circuit as well as a limiting circuit for obtaining a constant amplitude value of the frequency components generated in the component generator at the input of the modulator circuit which is controlled by the characteristic phase and amplitude data of the relevant sub-band.

The invention and its advantages will now be further explained with reference to the figures.

Figure 1:
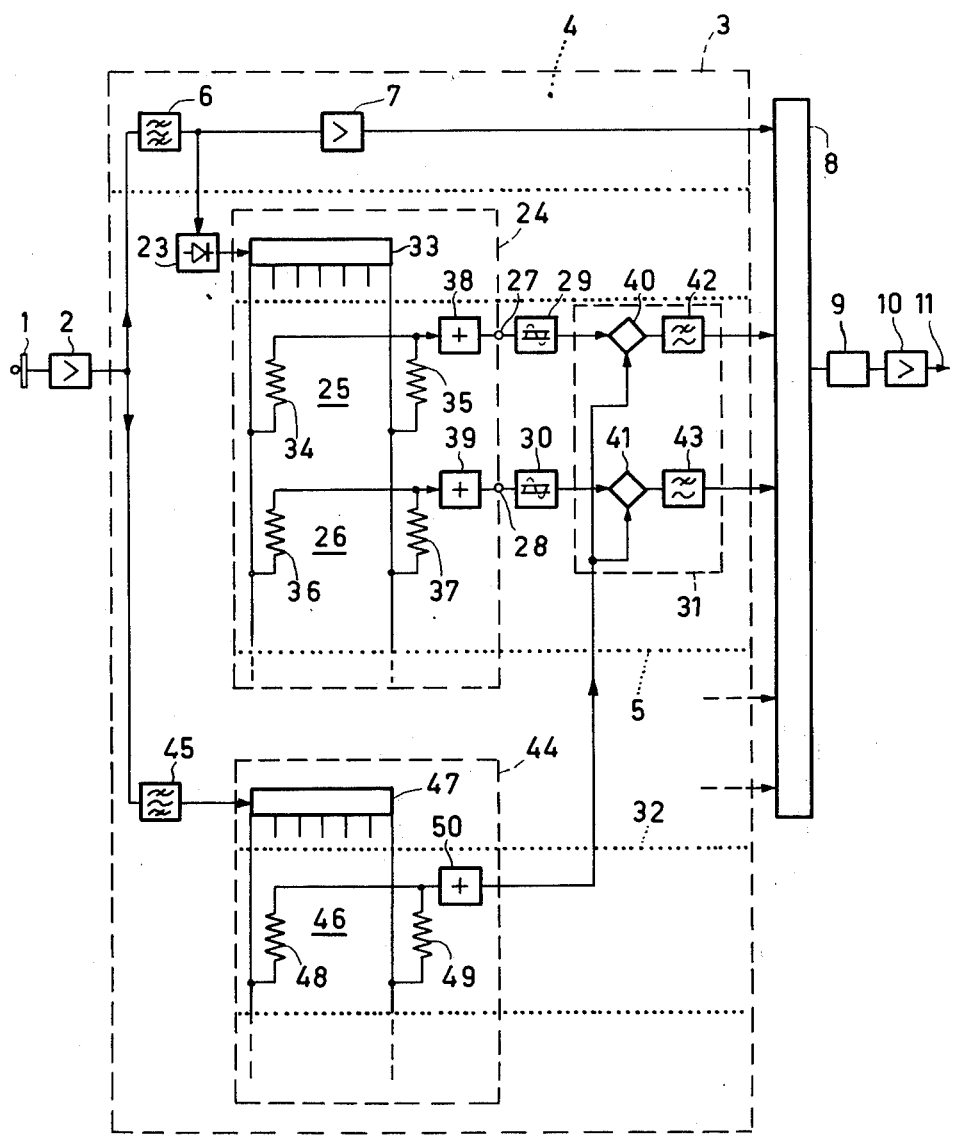
FIG. 1 and FIG. 2 show, an embodiment of a transmitter and of a receiver in a transmission system according to the invention.
Figure 2:
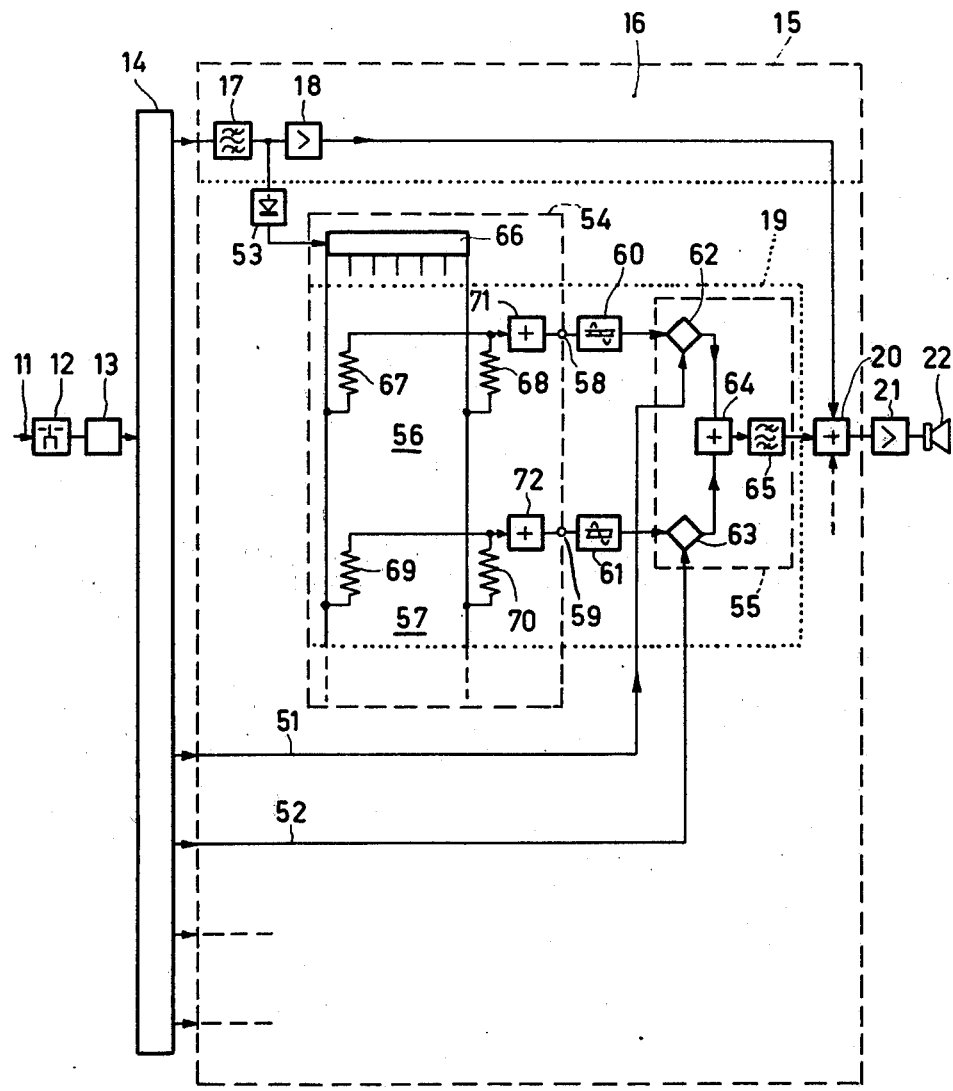

The transmitter and receiver shown in FIG. 1 and FIG. 2 are part of a transmission system which is arranged for the transmission of speech signals by means of pulse-code modulation.

For the transmitter shown in FIG. 1, the speech signals in the frequency band of from 300–3200 Hz are derived from a microphone 1 and are supplied, after amplification in an amplifier 2, to a band compressor 3 which is provided with a baseband channel 4 for a baseband signal located in a lower speech frequency band which in the embodiment shown is formed by the first formant range of 300–800 Hz. The band compressor 3 is also provided with a series of parallel band compressor channels 5 for band compression of successive sub-bands of the speech signals in the frequency range 800–3200 Hz located above the baseband. In the figure only one of the parallel band compressor channels is illustrated in detail as these channels are exactly the same in structure.

The baseband channel 4 is provided with an input filter 6, which passes the first formant range and which has a passband of 300–800 Hz, and a subsequent amplifier 7. The output of baseband channel 4 as well as the outputs of the sub-band compressor channels 5 are connected to a time division multiplex distributor 8 which feeds a subsequent pulse code modulator 9. In this way, a pulse train characterizing the speech signals to be transmitted is produced at the output of the pulse code modulator 9, which train is transmitted through a transmission path 11 after amplification in an output amplifier 10 having a suitably dimensioned output filter.

In the receiver in FIG. 2, which is associated with the transmitter shown in FIG. 1, the pulse train transmitted via the transmission path 11 is supplied, after pulse regeneration in a pulse regenerator 12 and subsequent demodulation in a pulse code demodulator 13, to a time division multiplex distributor 14 which is connected to a band expander 15 for recovering the original speech signals. Like the band compressor 3, the band expander 15 is provided with a baseband channel 16 having an input filter 17 passing the baseband signal of 300–800 Hz and a subsequent amplifier 18. This band expander 15 is also provided with a series of band expander channels 19 corresponding with the series of band compressor channels 5. The outputs of the baseband channel 16 and of the band expander channels 19 are connected to a summing circuit 20.

From the summing circuit 20 the recovered original speech signals in the band from 300-3200 Hz are derived and are fed to a reproducing device 22 via an amplifier 21.

In accordance with the invention a considerable improvement in the reproduction quality is obtained because the band compressor 3 in the transmitter of FIG. 1 comprises an input circuit which is provided with a component generator 23 connected to the baseband channel 4 for generating frequency components in the sub-bands of the speech frequency range of 800-3200 Hz which are located above the baseband of 300-800 Hz, and the band compressor 3 comprises furthermore a frequency analyzer 24 having for each sub-band a first sub-band filter 25 and a second sub-band filter 26 with the same amplitude-frequency characteristic but with phase-frequency characteristics mutually shifted in phase, (digital filters 25 and 26 are taught in U.S. Pat. No. 3,521,170), the band compressor 3 together with the sequence of parallel band compressor channels 5 also comprising a series parallel reference channels 32, and at least one of the channel sequences 5, 32 including the above said frequency analyser 24 having for each sub-band a first and a second sub-band filter 255 and 26, which band compressor 3 includes in the various band compressor channels 5 a comparator 31 as well as a limiting circuit 29, 30 for obtaining a constant amplitude value of the frequency components generated in the component generator 23 at the input of the comparator 31, which is controlled through a reference channel 32 by frequency components in the same sub-band of the original speech signal, which frequency components serve as a reference signal, for generating phase and amplitude data characteristic of the relevant sub-band.

In the embodiment shown the frequency analyser 24 is included in the series of parallel band compressor channels 5, the sub-band filters 25, 26 with outputs 27, 28 are each connected through a separate limiter 39, 30 to the comparator 31, and the component generator 23 is constructed as a signal distorter including a non-linear circuit. In FIG. 1 the frequency analyser 24 is formed by a delay circuit 33 and a plurality of weighting networks 34 ... 35; 36 ... 37 one end of each of which is connected to a point having a respective delay time in the delay circuit 33 and the other end to a summing circuit 38; 39 which is connected to one of the outputs 27, 28.

When the transfer factors of the weighting networks 34 ... 35; 36 ... 37 are suitably dimensioned, splitting up of the speech frequency range of 800-3200 Hz in successive sub-bands in accordance with a desired amplitude-frequency characteristic and phase-frequency characteristic can be realised in a simple manner and with a large mutual freedom by means of the frequency analyser 24 described, as will now be mathematically explained. If the number of delay elements of the delay circuit 33 is equal to 2M, each element having a delay time $s$, and if in a given sub-band filter, for example the sub-band filter 25, the weighting networks 34 ... 35 starting from the ends of the delay circuit 33 have been equalled pairwise, so that the transfer coefficients $C_p$ satisfy:

$$C_{-p} = C_p \text{ with } p = 1, 2, \ldots M,$$

then a transfer function is obtained whose amplitude-frequency characteristic has the form $\psi(\omega)$:

$$\Psi(\omega) = C_o + \sum_{p=1}^{M} 2C_p \cos(p\omega s)$$

and whose phase-frequency characteristic $\phi(\omega)$ is exactly linear according to:

$$\phi(\omega) = -M\omega s$$

Thus, the amplitude-frequency characteristic constitutes a Fourier series developed in M cosine terms, whose periodicity $\Omega$ is given by:

$$\Omega = 2\pi/s$$

If a given amplitude-frequency characteristic $\psi_o(\omega)$ must be realised, then the coefficients $C_p$ in the Fourier series can be determined by means of the equation:

$$C_p = (1/\Omega) \cdot \int_o^{\Omega} \Psi_o(\omega) \cdot \cos(p\omega s) d\omega$$

Negative coefficients $C_p$ in the Fourier series can be realised by including a polarity reversing stage in series with the weighting networks.

The form of the amplitude frequency-characteristic is herewith fully determined, but the periodic behaviour of the Fourier series results in that the desired amplitude frequency characteristic repeats itself with a periodicity $\Omega = 2\pi/s$, so for sufficiently low values of the delay time $s$ the frequency spacing between the desired and the next additional passband can be made sufficiently large to suppress the additional passbands by means of a simple suppression filter without affecting the amplitude-frequency characteristic and the linear phase-frequency characteristic in the desired passband in a noticeable manner. To that end, a simple suppression filter in a form of an RC low-pass filter may for example, be included in the summing circuits 38, 39.

Although other dimensioning rules are possible, it has proved to be advantageous for the construction described of the sub-band filter 25 to approximate the transfer characteristic of the associated second sub-band filter 26 with the same amplitude-frequency characteristic but with a phase-frequency characteristic which is shifted in phase, preferably with a phase shift $\pi/2$, by a series having M sine terms. In order to distinguish them, the transfer coefficients of the weighting networks 36 ... 37 are indicated herein by $S_p$. Starting from the ends of the delay circuit 33 the transfer coefficients $S_p$ of the weighting networks 36 ... 37 are pairwise equal in magnitude but of opposite sign, whilst the transfer coefficient of the central weighting network $S_o$ is equal to zero so that the transfer coefficients $S_p$ of the weighting networks satisfy the equation:

$$S_{-p} = -S_p \text{ with } p = 1, 2, \ldots M$$

$$S_o = O$$

For the transfer function then applies:

$$\Psi(\omega) = \sum_{p=1}^{M} 2S_p \sin(p\omega s)$$

$$\phi(\omega) = -M\omega s + \pi/2$$

From the above formulae it appears that the sub-band filter 26, like the sub-band filter 25, has a linear phase-frequency characteristic which, however, as compared with that of the sub-band filter 25 shows a constant phase shift of $\pi/2$, and that the amplitude-frequency characteristics of the sub-band filters 25, 26 can be made mutually equal by a suitable dimensioning of the coefficients $S_p$ in the Fourier series which may be determined by means of the equation:

$$S_p = (1/\Omega) \cdot \int_0^{\Omega} \Psi_e(\omega) \sin(p\omega s) d\omega.$$

Through the limiters 29, 30, the sub-band filters 25, 26 are connected to the comparator 31 which is composed of modulators 40, 41 and subsequent low-pass filters 42, 43 having cut-off frequencies of, for example, 20 Hz. At the same time, the phase and amplitude reference formed by the frequency components in the same sub-band of the original speech signal is fed to the two modulators 40, 41 through the relevant reference channel 32. In the embodiment of FIG. 1 a frequency analyser 44 is also included in the series of reference channels 32, which analyser is connected by means of an input filter 45 having a pass-band of 800-3200 Hz to the output of amplifier 2. The frequency analyser 44 comprises a number of sub-band filters 46, which correspond with the number of speech sub-bands and is constructed in like manner as the frequency analyser 24 above described from delay circuit 47, a plurality of weighting networks 48 ... 49 and a summing circuit 50: the dimensioning rule of the sub-band filter 25 is applied with advantage for the weighting networks 48 .. . 49.

By comparing the limited frequency components of the sub-band filters 25, 26 with the phase and amplitude reference of the frequency analyser 44 in the modulators 40, 41 and by the subsequent smoothing in the low-pass filters 42, 43, the phase and amplitude data associated with the sub-band of the band compressor channel 5 shown in FIG. 1 is obtained in the comparator 31, which data is supplied to the time division multiplex distributor 8 for further transmission together with the phase and amplitude data of the remaining band compressor channels (not shown in FIG. 1) and the baseband signal.

In the transmitter described, the first formant range of the speech signal in the band of 300-800 Hz is supplied as a baseband signal on the one hand to the baseband channel 4 through the amplifier 7 and on the other hand to the component generator 23 which is constructed as signal distorter, and thus at any instant, by means of signal distortion, the speech frequency components in the band 800-3200 Hz are artificially derived from the baseband signal of 300-800 Hz, which components are individually selected in the various sub-band filters 25, 26 by means of a suitable dimensioning of the frequency analyser 24. For this purpose the successive passbands of the sub-band filters 25, 26 have, for example, been made equal to 800-880 Hz, 880-960 Hz, 960-1040 Hz, 1040-1120 Hz, ..., respectively. By means of signal distortion in signal distorter 23, the frequency spectrum of the speech signals is generated in the band of 800-3200 Hz at any instant in a proper approximation. After having been brought to a constant amplitude in the limiters 29, 30, the frequency components selected in the sub-band filters 25, 26 are then compared, in the modulators 40, 45, with associated output filters 42, 43 of comparator 31, in amplitude and phase with the exact frequency components of the speech signal located in the band of 800-3200 Hz which is fed to the frequency analyser 44 through the input filter 45. No special demands need be made on the frequency analyser 24, as the selected frequency components are brought to a constant amplitude by the limiters 29, 30 independent of the amplitude-frequency characteristic of the sub-band filters 25, 26.

The various frequency components in the band compressor channels 5 are not only characterized by an amplitude and a frequency datum but also, in a clear contradistinction with the above-mentioned transmission system, by an additional phase datum which enables a more exact recovery of the various frequency components and which consequently results in a considerable improvement in the reproduction quality. Surprisingly, this improvement in the reproduction quality owing to the additional phase datum does not entail complications as regards equipment, but on the contrary it is accompanied by a simple and moreover convenient structure of the band compressor channels 5 for generating the phase and amplitude data as will now be explained mathematically.

To this end sub-band $k$ of the speech signal will be considered. If it is assumed that at a given instant a frequency component of the original speech signal is selected by the sub-band filter 46 of the frequency analyser 44, which component may be represented by $b_k \cos\omega_k t$, $b_k$ being an amplitude and $\omega_k$ the instantaneous angular frequency, and if it is furthermore assumed that the corresponding frequency component generated in the signal distorter 23 has a phase error $\phi_k$, then after frequency selection in the sub-band filters 25, 26 and limiting to a constant amplitude in the limiters 29, 30, the signals $\cos(\omega_k t + \phi_k)$ and $\sin(\omega_k t + \phi_k)$ will be obtained (next to higher harmonics) at the output of the limiters 29, 30. For simplicity it is here assumed that limitation was effected at a unit amplitude.

By means of modulation the signals $b_k \cos \omega_k t \cos(\omega_k t + \phi_k)$
$b_k \cos \omega_k t \sin(\omega_k t + \phi_k)$, are then respectively produced at the output of the two modulators 40, 41 from which, by means of smoothing with the aid of the low-pass filters 42, 43, the amplitude and phase data are obtained in the form of $b_k \cos \phi_k$ and $b_k \sin \phi_k$ which are fed to the time division multiplex distributer 8 for transmission by means of pulse-code modulation through the transmission path 11 for recovering the original speech signals in the receiver. It is precisely the use of the amplitude and phase data in the form of $b_k \cos \phi_k$ and $b_k \sin \phi_k$ which results in the particularly simple and little critical structure of the described band compressor 3. The same applies to the band expander 15 at the receiver side as will be explained with reference to the associated receiver in FIG. 2.

Compared with the transmission of speech signals in the band of 300–3200 Hz without band compression by means of pulse code modulation for which 60 kbit/s is used, the present transmission system only requires 10 kbit/s owing to the use of the band compressor 3 described, which corresponds with a band compression factor of 6. Besides the advantages of an excellent reproduction quality already mentioned and a simple, little critical and conveniently arranged structure the system described also has the advantage that it is particularly suitable for implementation in digital techniques and so for integration in a semiconductor body.

It should be noted that instead of the embodiment in FIG. 1 in which two sub-band filters 25, 26 having phase-frequency characteristics mutually shifted in phase are used for each sub-band in the frequency analyser 24, and only one sub-band filter 46 in frequency analyser 44, and other embodiment is also possible in which, to obtain the amplitude and phase data $b_k \cos \phi_k$ and $b_k \sin \phi_k$, the frequency analyser 24 is provided with only one sub-band filter for each sub-band and the frequency analyser 44 with two sub-band filters having phase-frequency characteristics mutually shifted in phase.

Figure 3:
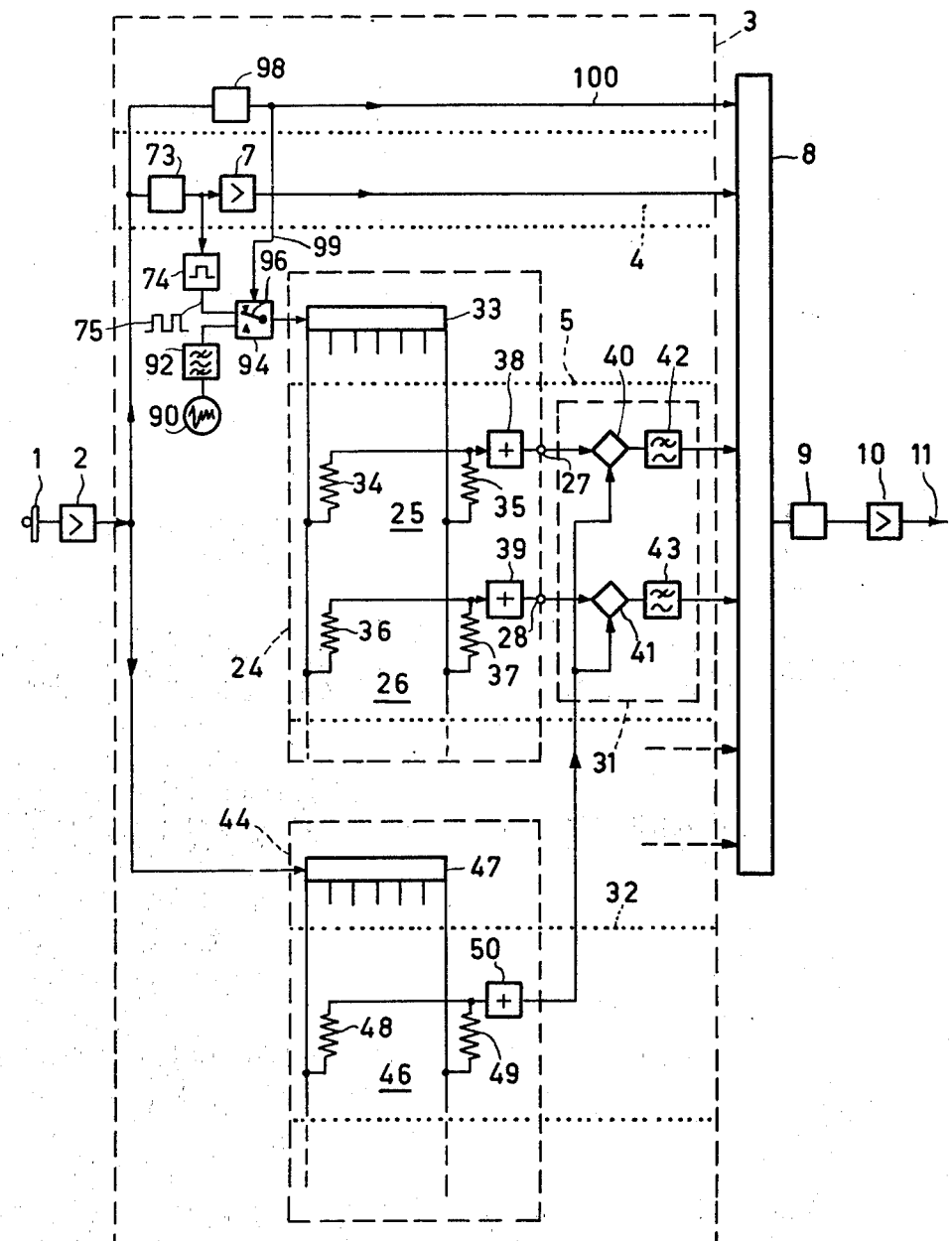
FIG. 3 and FIG. 4 show, a variant of the transmitter and of the receiver shown in FIG. 1 and FIG. 2.

In the receiver of FIG. 2, the data of the band compressor 3 of FIG. 3, which is transmitted by means of pulse code modulation through transmission path 11, becomes available, after pulse-code demodulation, in the pulse-code demodulator 13, for recovering the original speech signals in the band expander 15 at the outputs of the time division mutliplex distributor 14, particularly the first formant range of 300–800 Hz as the baseband signal for the baseband channel 16 and at leads 51, 52 the phase and amplitude data $b_k \cos \phi_k$ and $b_k \sin \phi_k$ of the band compressor channel 5 for sub-band $k$.

In accordance with the invention the band expander 15 comprises in FIG. 2 an input circuit which is provided with a component generator 53 connected to the baseband channel 16 for generating frequency components in sub-bands of the speech frequency range of 800–3200 Hz which is located above the baseband of 300–800 Hz, and the band expander 15 comprises furthermore a frequency analyser 54 having for each sub-band a first sub-band filter 56 and a second sub-band filter 57 with the same amplitude-frequency characteristic but with phase-frequency characteristics mutually shifted in phase, which frequency analyser 54 is included in the series of parallel band expander channels 19, and the various band expander channels 19 include a modulator circuit 55 as well as a limiting circuit 60, 61 for obtaining at the input of modulator circuit 55 a constant amplitude value of the frequency components generated in the component generator 53, which modulator circuit 55 is controlled by the characteristic phase and amplitude data of the relevant sub-band available at leads 51, 52.

As in the band compressor 3 of FIG. 1, the component generator 53 of FIG. 2 is constituted by a signal distorter and the outputs 58, 59 of the sub-band filters 56, 57 are connected each to a separate limiter 60, 61, which here, however, are connected to the modulator circuit 55 which is composed of modulators 62, 63 whose outputs are connected to a summing circuit 64; optionally a simple output filter 65 may be arranged after the adder circuit 64. Like the frequency analyser 24 at the transmitter side, the frequency analyser 54 is composed of a delay circuit 66, a plurality of weighting networks 67 ... 68; 69 ... 70 and summing circuits 71, 72, and the dimensioning of the sub-band filters 56, 57 has also been made equal to that of the sub-band filters 25, 26.

Also, in this case, the recovery of the original speech signals is based on the artificial generation of the speech frequency components in the band of 800–3200 Hz by distorting the baseband signal in the band of 300–800 Hz in the signal distorter 53. By selection in the sub-band filters 56, 57 and limiting in the limiters 60, 61, the frequency components for the various band expander channels 19 are obtained, from which components the sub-bands of the original speech signals are recovered by means of modulation in the modulator circuit 55 with the amplitude and phase data $b_k \cos \phi_k$ and $b_k \sin \phi_k$ of the leads 51, 52, which sub-bands are combined in the summing circuit 20 connected to the reproduction device 22 through the amplifier 21. Speech signals of an excellent reproduction quality are produced at the reproduction device 22, as the frequency components which were already generated with a good approximation in the signal distorter 53 are, at the proper frequency position, furthermore brought into accurate agreement as regards phase and amplitude with the original speech frequency spectrum by the band expander channels 19 described, as will now be mathematically explained.

Because the band compressor channels 5 and the band expander channels 19 comprise the same signal processing circuits which are formed by a signal distorter 23; 53, sub-band pass filters 25, 26; 56, 57, limiters 29, 30; 60, 61, the same output signal which is represented above by $\cos(\omega_k t + \phi_k)$ and $\sin(\omega_k t + \phi_k)$ will also be derived from the limiters 60, 61 in the band expander channel 19 for sub-band $k$ at the instant of reception which corresponds with the considered instant of transmission. At the same time the associated amplitude and phase data $b_k \cos\phi_k$ and $b_k \sin \phi_k$ is presented through leads 51, 52 to the modulators 62, 63 in the relevant band expander channel 19. In this way a signal $s(t)$ will be obtained at the output of the summing circuit 64 in the modulator circuit 55 which signal has the form:

$$s(t) = b_k \cos \phi_k \cos(\omega_k t + \phi_k) + b_k \sin \phi_k \sin(\omega_k t + \phi_k)$$

which may be reduced to:

$$s(t) = b_k \cos \omega_k t$$

So as regards frequency, phase and amplitude this signal $s(t)$ is exactly in agreement with the relevant spectrum component in the original speech signal, which therefore guarantees a substantially perfect reproduction quality.

Besides simplicity and a conveniently arranged structure the large degree of agreement between the band compressor channels 5 and the band expander channels 19 is apparent: all elements of the band expander channels 19, the summing circuit 64 and possibly the simple output filter 65 excepted, are already present in the band compressor channels 5 at the transmitter side, which from a technological point of view is particularly advantageous as the transmission system described can be realised with a minimum of different elements. Moreover, the transmission system described is suitable for implementation in digital techniques for integration in a semiconductor body. In particular, the frequency analysers 24, 44, 54 can also be constructed (as an alternative to analog techniques using an analog delay circuit composed e.g., of inductors and capacitors or of capacitor shift register sections) using digital techniques, for example in the manner which is already described in the U.S. Pat. No. 3,521,170, and also the modulators 40,41; 62, 63 used are particularly suitable for digital implementation owing to the preceding limiters 29, 30; 60, 61. For completeness sake it is to be noted that in the practical embodiments the limiters 29, 30; 60, 61 can be combined with the modulators 40, 41; 62, 63.

A variant of the transmission system discussed above is shown in FIG. 3 and FIG. 4, which system differs from the transmission system shown in FIG. 1 and FIG. 2 in that instead of the first formant range the fundamental tone frequency is transmitted as the baseband signal. Corresponding elements in FIGS. 1–4 are indicated with the same reference numerals.

In the transmitter shown in FIG. 3 the speech signals in the band of 300–3200 Hz are therefore supplied, after amplification in the amplifier 2, to a fundamental tone detector 73 which supplies a sinusoidal output signal of fundamental tone frequency in the band of 80–250 Hz. The fundamental tone detector 73 is connected to the amplifier 7 of baseband channel 4 and also to the component generator 74 which is constituted by a fundamental tone pulse generator, which component generator supplies, in the rhythm of the fundamental tone in the original speech signal, a pulse shaped output signal of the shape illustrated by curve 75 at a repetition frequency in the band of 80–250 Hz.

As in the transmitter of FIG. 1, the component generator 74 in the form of a fundamental tone pulse generator artificially generates a good approximation of the frequency spectrum of the original speech signal. After frequency selection in the two sub-band pass filters 25, 26 of the frequency analyser 24 the frequency components are processed in the band compressor channels 5 to generate the phase and amplitude data of the form $b_k \cos \phi_k$ and $b_k \sin \phi_k$ at the output of the low-pass filters 42, 43 in comparator 31.

The structure of this band compressor 3, however, differs from that in FIG. 1 in that the constant amplitude value of the frequency components (selected in the frequency analyser 24) at the input of comparator 31 is not effected here by incorporating separate limiters 29, 30 in the various band compressor channels 5 but by incorporating a limiter in the component generator 74 constructed as fundamental tone pulse generator, which limiter brings all frequency components for the various sub-bands to a constant amplitude value so that here a common limiter for all band compressor channels 5 is sufficient. In exactly the same way as in FIG. 1 also, the said phase and amplitude data of the form $b_k \cos \phi_k$ and $b_k \sin \phi_k$ is derived in comparator 31 from the various band compressor channels 5 by comparing the phase and amplitude of the frequency components selected in the frequency analyser 24 and brought to a constant amplitude value with the corresponding frequency components of the original speech signal selected in the sub-band pass filters 46 of the frequency analyser 44. This data is transmitted together with the baseband signal to the associated receiver in FIG. 4 through the time division multiplex distributor 8, the pulse code modulator 9 and the amplifier 10. Compared with the transmission system in FIG. 1 and FIG. 2, a larger band compression factor is obtained with the transmission system now under consideration because, instead of faithfully transmitting the speech signals in the first formant range of 300–800 Hz, these speech signals are also transmitted with band compression in this instance, for which the bandwidth of the baseband signal need not be more than 170 Hz.

Figure 5:
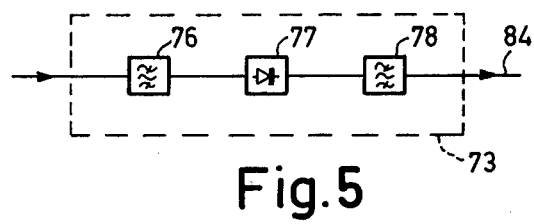
FIGS. 5–8 show in more detail some elements which are used in the transmission system having the transmitter and receiver of FIG. 3 and FIG. 4.
Figure 6:
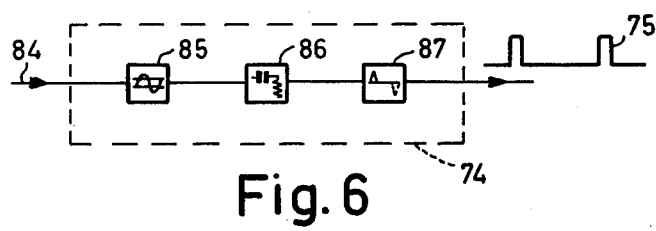

For completeness' sake, FIG. 5 and FIG. 6 show simple embodiments of a fundamental tone detector 73 and a fundamental tone pulse generator 74 which may be used in FIG. 3.

For the fundamental tone detector 73 shown in FIG. 5 the speech frequencies in the band of 300–800 Hz derived from a filter 76 are fed to an amplitude detector 77 which is followed by an output filter 78 having a passband of 80–250 Hz, and a sinusoidal output signal of fundamental tone frequency is derived from the output filter 78 and fed through a lead 84 to the fundamental tone pulse generator 74 shown in FIG. 6.

The fundamental tone pulse generator 74 shown in FIG. 6 comprises a limiter 85 which is connected to the lead 84 and which is followed by a differentiating network 86 for converting the square wave voltage obtained by the limiting action into a train of alternating positive and negative pulses, which network 86 is followed by a threshold circuit 87 which, for example, suppresses the negative pulses. Thus, a train of positive pulses of fundamental tone frequency and of the form shown by curve 75 is produced at the output of the threshold circuit 87 and fed to the frequency analyser 24 for further processing.

Figure 4:
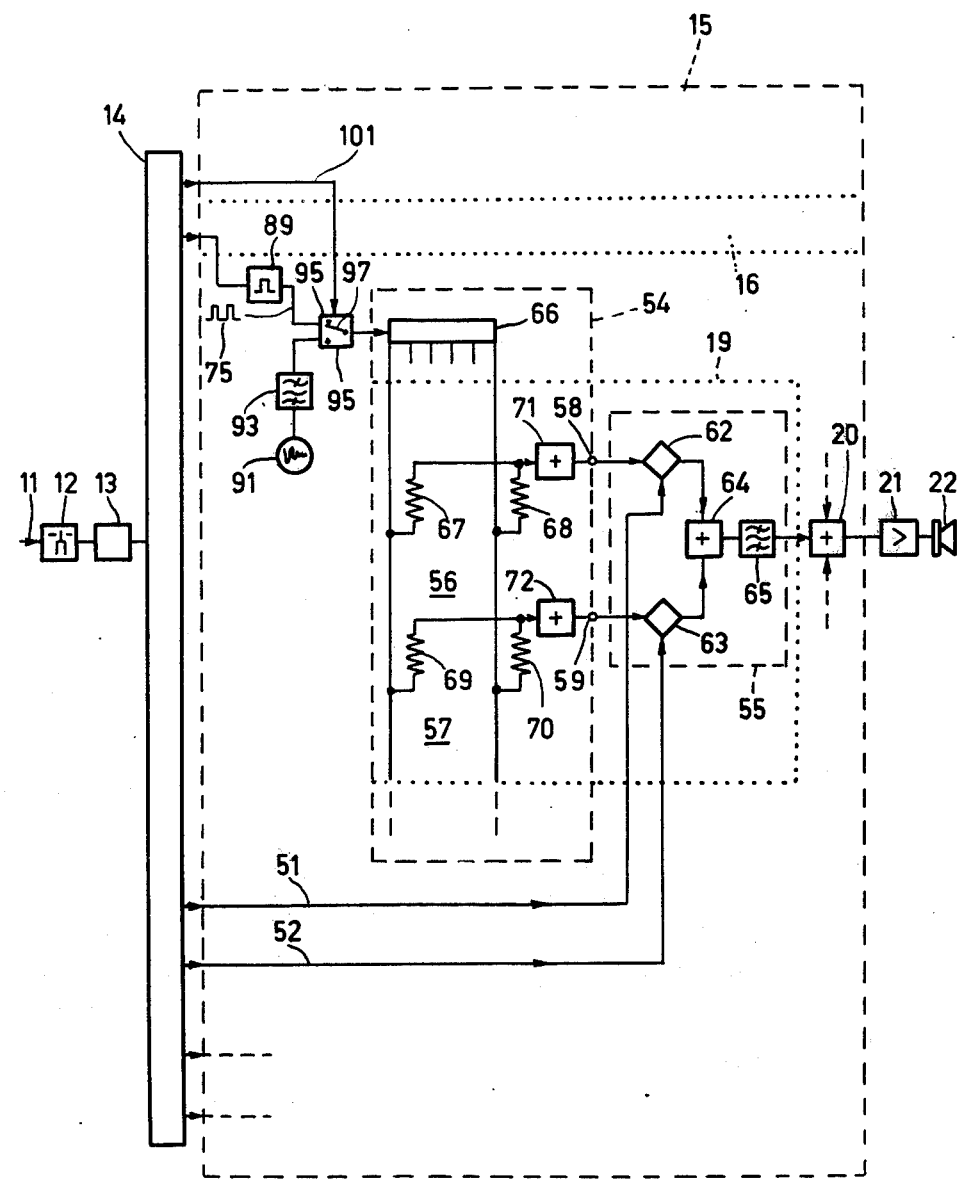

As an alternative to the fundamental tone detector 73 and fundamental tone pulse generator 74 shown in FIGS. 5 and 6, fundamental tone detectors and fundamental tone pulse generators of another type may be used in the transmission system according to FIG. 3 and FIG. 4. For example, a fundamental tone pulse generator may be used which supplies sawtooth output pulses, whilst a bistable or monostable relaxation generator may be used as limiter 85 in FIG. 6.

In the receiver in FIG. 4 associated with the transmitter in FIG. 3, the incoming pulse train is fed, after pulse regeneration in a pulse regenerator 12 and demodulation in a pulse code demodulator 13, to the time division multiplex distributor 14 which, for recovering the original speech signals, is connected to the band expander 15 provided with parallel arranged band expander channels 19 and with a baseband channel 16, to which a component generator is connected which is controlled by the transmitted output signal of the fundamental tone detector 73 and which is constituted by a fundamental tone pulse generator 89.

Like the transmission system described in FIG. 1 and FIG. 2, an accurate frequency and phase synchronisation is effected between the frequency components in the output signals of the component generator 74 of the band compressor 3 and those in the output signals of the component generator 89 of the band expander 15 with the aid of the synchronisation circuit formed by the baseband channels 4, 16. The output signal of the component generator 89 is processed in the same way as in the band expander 15 of FIG. 2. In particular, the component generator 89 is constituted by the fundamental tone pulse generator connected to the frequency analyser 54 which comprises for each sub-band the sub-bandpass filters 56, 57 whose outputs 58, 59 are connected to the modulators 62, 63 in the modulator circuits 55 controlled by the phase and amplitude data of the form $b_k \cos \phi_k$ and $b_k \sin \phi_k$ present on leads 51, 52. At the output of the modulator circuits 55 the speech component $b_k \cos \omega_k t$ is then recovered which, as explained in detail for FIG. 2, accurately corresponds as regards frequency, phase and amplitude with the relevant component in the original speech signal, which recovered speech component is combined with the speech components of the other band expander channels 19 in summing circuit 20 and supplied to the reproduction device 22 through the amplifier 21.

Due to the limiting operation in the band compressor channels 5 and the band expander channels 19 the transmission system described also appears to be little critical in implementation. In particular the proper operation is hardly affected by the form of the output signal of the component generator 74 and 89, provided only the generated frequency spectra, as regards their frequencies, form a good approximation of the frequency spectrum of the original speech signal, which fact gives more scope for designing and ultimately results in a simplification of equipment. For example, instead of the sawtooth output signal of the usual fundamental tone generators, in the embodiment described the pulses of fundamental tone frequency delivered by the fundamental tone pulse generator shown in FIG. 6 will do for further processing.

As compared to FIG. 1 and FIG. 2 a considerable saving in equipment is obtained in this embodiment because the separate limiters in the various band compressor channels 5 and in the band expander channels 18 are here replaced by a limiter which is common for all band compressor channels 5 and band expander channels 19 in the fundamental tone pulse generator 74, 89, and furthermore the frequency analyser 44 in the band compressor 3 can be dispensed with by using purely product modulators for modulators 40, 41.

Also, with the transmission system considered here, a very good reproduction quality is realised, and, moreover, the reproduction quality of the consonants can be improved here such as, for example, the letter sounds $s$ and $f$ which are mainly characterized by a noise-like frequency spectrum located in the higher speech frequency range.

To this end, both the band compressor 3 in FIG. 3 and the band expander 15 in FIG. 4 comprise a respective noise generator 90, 91 provided with a respective output filter 92, 93 having a suitable passband, of, for example 300–3200 Hz, and a subsequent electronic switch 94, 95 which comprises a switching contact 96, 97 controlled by a switching signal and two contacts which are connected to respectively the fundamental tone pulse generator 74, 89 and the output filter 92, 93. Optionally, a limiter may be connected to the output of the noise generator 90, 91 to suppress noise peaks. Jointly the switching contacts 96, 97 of the two electronic switches 94, 95 are controlled by a switching signal derived from a consonant detector 98 connected to the amplifier 2 in the transmitter, namely the electronic switch 94 in the band compressor 3 through a lead 99 and the electronic switch 95 in the band expander 15 through a lead 100, time division multiplex distributor 8, time division multiplex distributor 14 at the receiver side and a lead 101. Besides a saving in equipment the joint control by the same consonant detector 98 results in an accurate synchronisation of the switch-over instants of the electronic switches 94, 95 in the band compressor 3 and the band expander 15.

Figure 7:
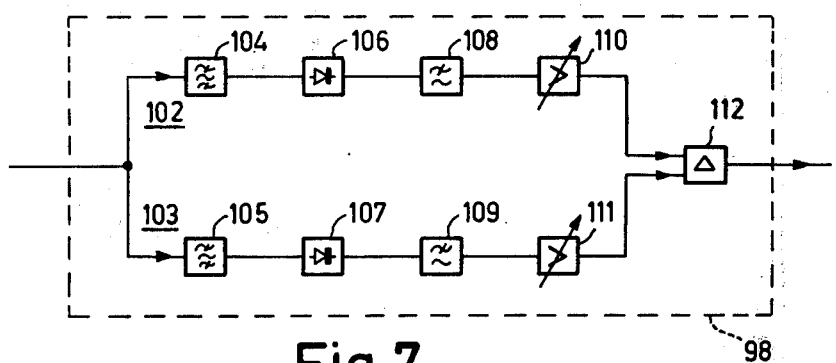

For illustration, FIG. 7 shows in more detail a simple embodiment of the consonant detector 98 in FIG. 3. This consonant detector is composed of two parallel branches 102, 103 having respectively a filter 104 which passes the lower speech frequencies of, for example, 300–800 Hz and a filter 105 which passes the higher speech frequencies of, for example, 2000–3000 Hz, which filters are followed by rectifiers 106, 107 and by low-pass filters 108, 109 having a cut-off frequency of, for example, 20 Hz for generating output signals which vary with the level of said speech frequencies. After amplification in an adjustable amplifier 110, 111 these signals yield in an amplitude comparator 112 a switching signal, the polarity of which, for example, depends on whether a vowel in the form of, for example, the letter sounds $a$ and $e$, or a consonant in the form of, for example, the letter sounds $s$ and $f$ are produced. Namely, a suitable adjustment of the amplification of the amplifiers 110, 111 results in that, depending on whether a vowel or a consonant is produced, the signal level of the lower speech frequencies or that of the higher speech frequencies will dominate in the amplitude comparator 112.

If a vowel is produced then the switching contact 96, 97 of the electronic switches 94, 95 in the band compressor 3 and in the band expander 15 will be adjusted by the switching signal to the position where it is connected to the fundamental tone pulse generator 74, 89. In the manner explained hereinbefore the phase and amplitude data of the various speech components is then generated in the comparator 31 of the various band compressor channels 5 and by means of this data the various components of the original speech signal are recovered in the modulator circuit 55 of the corresponding band expander channels 19, which components are supplied to the reproduction device 22 through summing circuit 20 and amplifier 21. In the reverse case, when a consonant is produced, the switching contact 96, 97 of the electronic switches 94, 95 will be adjusted by the switching signal of the consonant detector 98 to the position where it is connected to the noise generators 90, 91. In the comparator 31 of the various band compressor channels 5 the noise data is then generated and in the modulator circuit 55 of the various band expander channels 19 the correct amount of noise for the consonant reproduction will be realised by means of this noise data.

In this simple manner an excellent reproduction of both vowels and consonants is guaranteed. In the transmission system according to FIG. 1 and FIG. 2 the noise character at the reproduction of consonant may possibly be accentuated in the manner described here.

In a variant of the transmission system shown in FIG. 3 and FIG. 4, a fundamental tone frequency detector is used for a further bandwidth reduction instead of the fundamental tone detector 73 which enables said further bandwidth reduction by means of frequency detection of the fundamental tone. If, for example, the fundamental tone used as the baseband signal still occupies the band of 80–300 Hz, then the frequency-detected fundamental tone only occupies a band having a width of 20 Hz.

Figure 8:
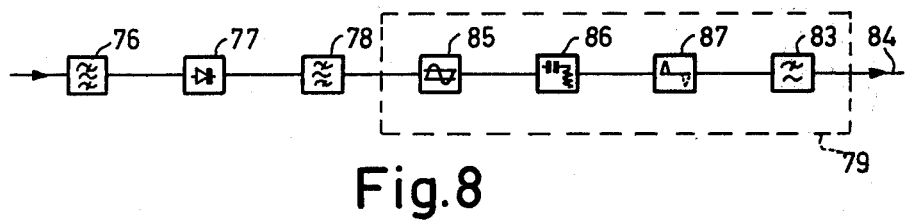

For illustration FIG. 8 shows a simple embodiment of a fundamental tone frequency detector. It comprises a fundamental tone detector having, as in FIG. 5, an input filter 76, an amplitude detector 77 and an output filter 78 as well as a subsequent frequency detector 79, the detected fundamental tone being supplied in the manner as in FIG. 6 for frequency detection, to the cascade arrangement of a limiter 85, a differential network 86, and a threshold circuit 87.

As in FIG. 6, a train of pulses of fundamental tone frequency and of, for example, a positive polarity is produced at the output of the threshold circuit 87. By smoothing this pulse train in a lowpass filter 83 having a cut-off frequency of, for example, 20 Hz an output signal is obtained which varies with the fundamental tone frequency, which signal is supplied to the fundamental tone pulse generator in the band compressor 3 and through the baseband channel 4 to the fundamental tone pulse generator in the band expander 15.

The fundamental tone pulse generator associated with the fundamental tone frequency detector in FIG. 8 differs from the fundamental tone pulse generator in FIG. 6 in that instead of a limiter 85 an astable relaxation generator of the multivibrator type having a natural frequency of 165 Hz is used, which relaxation generator is controlled in its frequency by the output signal of the fundamental tone frequency detector in FIG. 8. A square-wave output signal which varies with the fundamental frequency is produced at the output of the relaxation generator, which signal is further processed through the differentiating network 86 and the threshold circuit 87 in the same way as in FIG. 6.

Besides the special advantages in structure and implementation specified above, this variant of the transmission system also has the advantage that a maximum band compression factor is realised, while maintaining a good reproduction quality.

Figure 9:
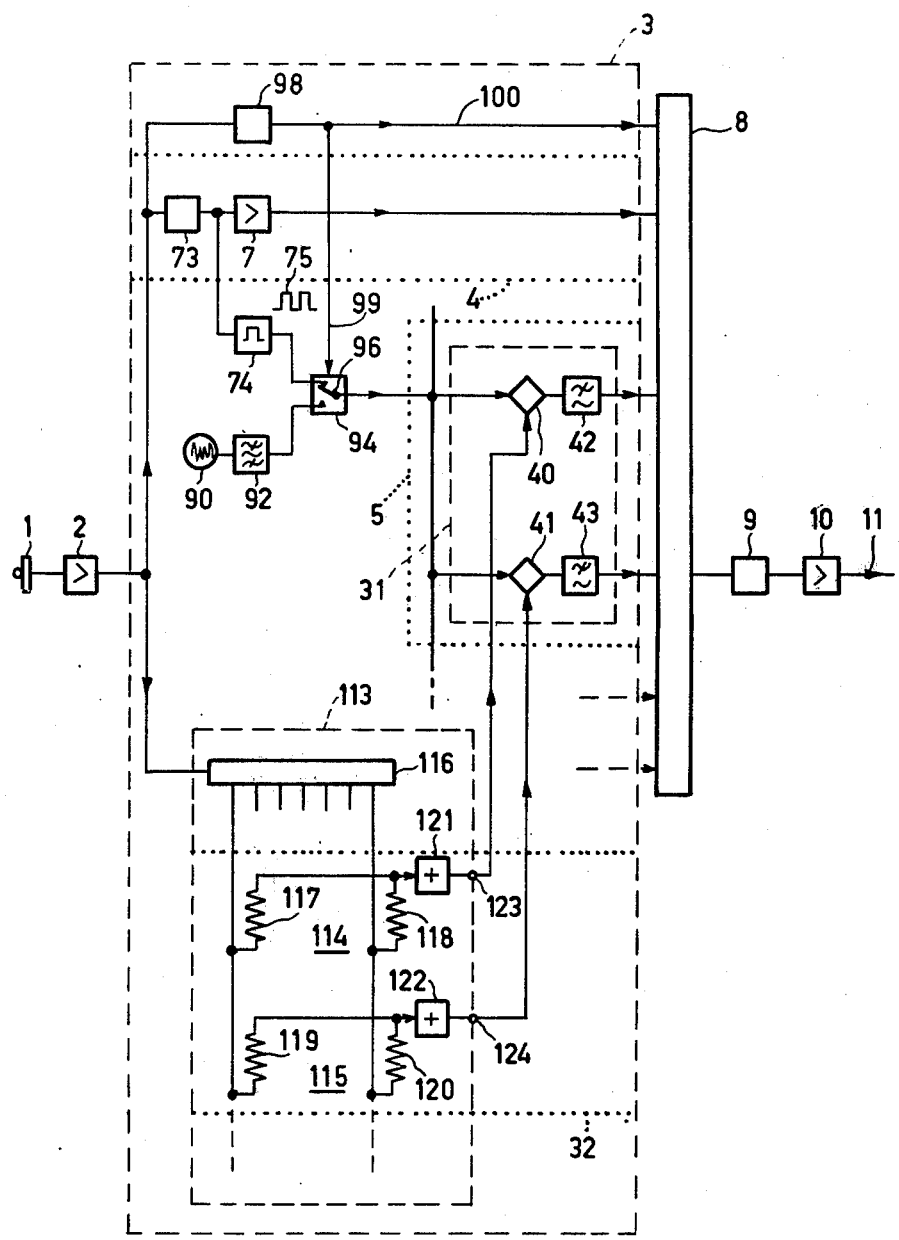
FIG. 9 shows a simplified embodiment of a transmitter in a transmission system according to the invention.

FIG. 9 shows a particularly simple embodiment of the transmitter shown in FIG. 3 for a transmission system according to the invention. Elements in FIG. 9 which correspond with FIG. 3 are given the same reference numerals.

Compared with FIG. 3, the transmitter in FIG. 9 differs in that the component generator formed by the fundamental tone pulse generator 74 as well as the noise generator 90 are here connected through the electronic switch 94, without the use of the frequency analyser as an intermediate circuit, to the two modulators 40, 41 of the comparator 31 in each of the parallel band compressor channels 5. A further distinction is that now a frequency analyser 113 having for each sub-band a first sub-bandpass filter 114 and a second sub-bandpass filter 115 with the same amplitude-frequency characteristic, but with phase-frequency characteristics having a relative phase difference, are included in the series of parallel reference channels 32. The frequency analyser 113 is constructed in exactly the same manner as the frequency analyser 24 already described above and is, in particular, provided with a delay circuit 116, a plurality of weighting networks 117 . . . 118; 119 . . . 120 and summing circuits 121, 122 having outputs 123, 124 which are connected to the modulators 40, 41 of comparator 31.

In its operation this band compressor 3 in FIG. 9 fully corresponds with that in FIG. 3. In greater detail, when a vowel is produced, the phase and amplitude data of the relevant band compression channel 5 of the form $b_k \cos \phi_k$ and $b_k \sin \phi_k$ is generated by comparing the pulses of fundamental tone pulse generator 74 in the modulators 40, 41 with the reference signals obtained from sub-bandpass filters 114, 115 and, when a consonant is produced, the noise data belonging to the relevant consonant is generated by connecting the noise generator 90 through the electronic switch 94 to modulators 40, 41.

In the manner set forth above the various data of the band compressor 3 is transmitted to a band expander 15 of the type shown in FIG. 4 for recovering the original speech signals. An accurate phase synchronisation of the band expander 15 with the band compressor 3 can be realised in a simple manner by using the band compressor described here by, for example, including at the output of the electronic switch 94 a delay circuit having a delay time equal to the delay time of the frequency analyser 54 in the band expander 15.

As in the transmission system of FIG. 3 and FIG. 4, an excellent reproduction quality is realised when the band compressor 3 shown in FIG. 9 is used, and together with the advantage that a frequency analyser can be dispensed with, the additional advantage is obtained that the modulators 40, 41 may be implemented as switching modulators which are particularly suitable for integration in a semiconductor body.

Within the scope of the invention still further embodiments are possible. In FIG. 1 and FIG. 2 it is, for example, possible to utilize the cascade arrangement of a fundamental tone detector 73 and fundamental tone pulse generator 74 of the type shown in FIGS. 5 and 6 instead of the component generator 23, 53 in the form of a signal distorter. In the band expander 15 in FIG. 4 it is optionally also possible to supply the output signal of the electronic switch 95 direct to modulators 62, 63, it then being necessary that the frequency analyser with sub-band filters having the same amplitude-frequency characteristics, but with phase-frequency characteristics showing a relative phase difference is arranged behind the modulators 62, 63.

What is claimed is:

1. A speech transmission system comprising a band compressor including a baseband channel means for transmitting a baseband of speech signals located in a lower speech frequency range, a plurality of parallel band compressor channel means for band compression of successive sub-bands of speech signals above said lower range, means having an input coupled to said base-band channel and an output coupled to said band compressor channels for generating components in said sub-bands of said speech frequency range, a plurality of parallel reference channel means for generating reference frequency components in the same sub-bands as said compressor sub-bands, at least one of said plurality of channels comprising a frequency analyzer coupled to said component generator and having for each sub-band first and second sub-bandpass filters with the same amplitude frequency characteristics and differing phase-frequency characteristics, each of said band compressor channels including a comparator having a first input means for receiving a constant amplitude signal from said component generating means, a second input coupled to the respective reference channel to receive said reference signal components and an output means for providing phase and amplitude data characteristics of the respective sub-bands.

2. A transmission system as claimed in claim 1, wherein the frequency analyser having for each sub-band a first and a second sub-bandpass filter with the same amplitude-frequency characteristics having a relative phase difference comprises a delay circuit and a plurality of weighting networks, one end of each of these weighting networks being connected to a point of a respective delay time in the delay circuit, and a summing circuit coupled to the remaining ends.

3. A transmission system as claimed in claim 2, wherein the first and second sub-bandpass filters for the same sub-band in the frequency analyser have phase-frequency characteristics having a relative phase difference of $\pi/2$.

4. A transmission system as claimed in claim 1, wherein the comparator in the band compressor comprises a first and a second modulator, said modulators being controlled by the frequency components of constant amplitude from the component generator and by the frequency components in the relevant sub-band of the original speech signal, a pair of low pass filter means coupled to said modulators respectively for providing the phase and amplitude data of the relevant sub-band.

5. A transmission system as claimed in claim 1, wherein the band compressor further comprises a consonant detector fed by the speech signals to be transmitted, a noise generator, an electronic switch means controlled by the consonant detector for connecting the component generator in response to a vowel and for connecting said noise generator in response to a consonant to the input of the plurality of band compressor channels.

6. A transmission system as claimed in claim 1, wherein the base-band channel in the band compressor and a baseband channel in a receiver band expander together comprise a synchronization circuit for the mutual synchronization of the component generators in the band compressor and in the band expander.

7. A transmission system as claimed in claim 1, wherein the remaining plurality of channels further comprises an additional frequency analyser having only one sub-bandpass filter for each sub-band.

8. A transmission system as claimed in claim 1, further comprising a limiter circuit means for obtaining the constant amplitude value of the frequency components including separate limiters which are connected to the sub-bandpass filters of the frequency analyser.

9. A transmission system as claimed in claim 8, wherein the baseband signal comprises the first formant frequency range, and the component generator connected to the baseband channel comprises a frequency distorter which includes a non-linear circuit.

10. A transmission system as claimed in claim 1 further comprising a limiting circuit means for obtaining the constant amplitude value of all frequency components comprising a common limiter in the component generator.

11. A transmission system as claimed in claim 10, wherein the component generator comprises a fundamental tone pulse generator.

12. A transmission system as claimed in claim 4, wherein the component generator comprises a fundamental tone pulse generator, the output signal of the fundamental tone pulse generator being supplied direct to the two modulators of the comparator, said modulators comprising switching modulators.

13. A transmission system as claimed in claim 12, further comprising a delay circuit coupled between the fundamental tone pulse generator and the comparator and having a delay time equal to the delay time of a frequency analyser in a receiver band expander.

14. A transmission system as claimed in claim 4, further comprising a common limiter disposed in the component generator to obtain a constant amplitude value of all frequency components, the original speech signal being supplied direct to two modulators of the comparator, said modulators comprising product modulators.

15. A receiver for band compressed speech signals comprising a band expander including a baseband channel, a plurality of a sub-band expander channels, means having an input coupled to said baseband channel and an output coupled to said expander channels for generating components in said subbands, a frequency analyzer coupled to said component generator and having for each sub-band first and second sub-bandpass filters with the same amplitude-frequency characteristics and differing phase frequency characteristics, and a modulator circuit having a first input means for receiving a constant amplitude signal from said component generator, a second input means for receiving reference phase and amplitude data, and an output means for supplying a portion of the original speech signal.

16. A receiver as claimed in claim 15 wherein the modulator circuit in the band expander comprises a first and a second modulator, said modulators being controlled by frequency components of constant amplitude from the component generator and by the phase and amplitude data belonging to the relevant sub-band, and a summing circuit means connected to the modulators for providing the recovered sub-band.

17. A receiver as claimed in claim 15 characterized in that the frequency analyser comprises a delay circuit and a plurality of weighting networks, one end of each of these weighting networks being connected to a point of a respective delay time in the delay circuit, and a summing circuit coupled to the remaining end.

18. A receiver as claimed in claim 17, wherein the first and second sub-bandpass filters for the same sub-band in the frequency analyzer have phase-frequency characteristics having a relative phase difference of $\pi/2$.

19. A receiver as claimed in claim 15, wherein the band expander includes a noise generator, electronic switch means controlled by the baseband channel for connecting the component generator in response to a vowel and for connecting said noise generator in response to a consonant to the input of the plurality of band expander channels.

20. A receiver as claimed in claim 15, wherein a base-band channel in a transmitter band compressor and the base-band channel in the band expander together comprise a synchronization circuit for the mutual synchronization of the component generators in the band compressor and in the band expander.

21. A receiver as claimed in claim 15, further comprising a limiter circuit means for obtaining the constant amplitude value of the frequency components including separate limiters which are connected to the sub-bandpass filters of the frequency analyser.

22. A receiver as claimed in claim 21, wherein the baseband signal comprises the first formant frequency range, and the component generator connected to the baseband channel comprises a frequency distorter which includes a non-linear circuit.

23. A receiver as claimed in claim 15, further comprising a limiting circuit means for obtaining the constant amplitude value of all frequency components comprising a common limiter in the component generator.

24. A receiver as claimed in claim 23, wherein the component generator comprises a fundamental tone pulse generator.

* * * * *